(12) United States Patent
Suzuki et al.

(10) Patent No.: US 6,392,761 B1
(45) Date of Patent: May 21, 2002

(54) SCANNER SYSTEM INCLUDING SCANNER AND SHEET FEED ADAPTER

(75) Inventors: Minoru Suzuki, Tochigi-ken; Katsuyoshi Suzuki, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/310,738

(22) Filed: May 13, 1999

(30) Foreign Application Priority Data

May 15, 1998 (JP) ............................................. 10-132920

(51) Int. Cl.⁷ ............................ H04N 1/024; H04N 1/04
(52) U.S. Cl. ....................................... 358/473; 358/496
(58) Field of Search ................................. 358/473, 498, 358/505, 474, 401, 483, 496; 382/313, 312; 271/3.14

(56) References Cited

U.S. PATENT DOCUMENTS 5,739,923 A * 4/1998 Kawahara ................... 358/473
5,865,431 A * 2/1999 Ma ............................ 271/3.14
6,108,106 A * 8/2000 Hayashi et al. ............. 358/473

* cited by examiner

*Primary Examiner*—Cheukfan Lee
(74) *Attorney, Agent, or Firm*—Greenblum & Bernstein, P.L.C.

(57) ABSTRACT

A scanner system is provided with a scanner provided with an image sensor, and a sheet feed adapter detachably coupled to the scanner. A predetermined surface of the sheet feed adapter faces the image sensor when the sheet feed adapter is coupled to the scanner. The scanner is operable in a hand scan mode when the sheet feed adapter is detached from the scanner, and in a sheet through mode when the sheet feed adapter is coupled to the scanner. In the sheet through mode, an original to be scanned is automatically fed between the predetermined surface and the image sensor. A predetermined image is formed on the predetermined surface of the sheet feed adapter, and the scanner comprises a judging system that judges that the sheet feed adapter is coupled to the scanner only when the image sensor scans the predetermined image on the predetermined surface of the sheet feed adapter.

16 Claims, 9 Drawing Sheets

SCANNER SYSTEM INCLUDING SCANNER AND SHEET FEED ADAPTER

BACKGROUND OF THE INVENTION

The present invention relates to a scanner system, and more particularly to a scanner system which is operable either in a mode where a scanner is moved on an original, or in another mode where an original is fed by a sheet feeder Conventionally, a scanner system having a scanner which is provided with a line sensor extending in a predetermined direction (i.e., a main scanning direction) has been known. The scanner is positioned on an original, and then moved in a direction (i.e., an auxiliary direction) which is perpendicular to the extending direction of the line sensor to scan a two-dimensional area of the original. The scanner system may further be provided with an auxiliary device which enables the scanner system to feed the original in the auxiliary direction. In such a system, instead of moving the scanner, by coupling the auxiliary device to the scanner, the original is automatically fed and scanned.

In the scanner system having the automatic sheet feed function, operation sequences (i.e., operation programs) when the scanner is moved on the original and when the original is fed by the sheet feed function should be changed. In particular, if the auxiliary device to be coupled to the scanner is provided with a sheet feeding mechanism which can operate independently of the scanner, the sheet feeding mechanism should be controlled by the scanner so that the sheet feeding operation is executed synchronously with the scanning operation of the scanner. For this purpose, both the scanner and the auxiliary device should be constituted to communicate with each other, i.e., interfaces and communication ports should be provided. Further, a sensor should be provided to detect whether the auxiliary device is coupled to the scanner. Such a constitution prevents the scanner system from being formed compact and inexpensive.

If the sheet feeding mechanism is of a mechanism utilizing driving force of the scanner, communication between the auxiliary device and the scanner is unnecessary, and accordingly the interfaces and communication ports may be eliminated. However, also in this case, a sensor for detecting whether the auxiliary device is coupled to the scanner should be provided. A micro-switch is generally used as the sensor for detecting coupling of the auxiliary device to the scanner, and such a constitution still requires certain space.

Recently, as a line sensor, a so-called CIS (Contact Image Sensor) has been developed and widely used for scanners. The CIS has a plurality of CCD elements arranged in a line, gradient index lens array, and a light source. The CIS is made to contact an original document to be scanned. The document is illuminated by the light source, and reflected light is directed to the CCD elements via the gradient index lens array. The CCD elements accumulate electric charges in accordance with received light amount. Because of its structure, the scanner employing the CIS can be made compact. However, if the auxiliary device having a sheet feeding mechanism is to be coupled to the scanner, the scanner should be constituted to have a sufficient room for receiving the auxiliary device. Further, each of the scanner and the auxiliary device should be formed to have a shape which ensures, without malfunction, the detection of the auxiliary device. Such a constitution prevents the scanner system from being made compact, and increases manufacturing cost.

SUMMARY OF THE INVENTION

It is therefore an object of the invention to provide an improved scanner system, which is operable in a mode where the scanner is moved on an original and the image is scanned and in another mode where an auxiliary device is coupled to the scanner and the original is automatically fed and scanned, the operation mode of which can be detected without error, with a simple and compact structure.

For the above object, there is provided a scanner system which is provided with: a scanner provided with an image sensor; and a sheet feed adapter detachably coupled to the scanner. A predetermined surface of the sheet feed adapter faces the image sensor when the sheet feed adapter is coupled to the scanner. The scanner is operable in a hand scan mode when the sheet feed adapter is detached from the scanner, and in a sheet through mode when the sheet feed adapter is coupled to the scanner. In the sheet through mode, an original to be scanned is automatically fed between the predetermined surface and the image sensor. A predetermined image is formed on the predetermined surface of the sheet feed adapter, and the scanner comprises a judging system that judges that the sheet feed adapter is coupled to the scanner only when the image sensor scans the predetermined image on the predetermined surface of the sheet feed adapter.

Since the image sensor is used for detecting the sheet feed adapter, additional sensor such as a micro-switch is not necessary. Thus, the system can be made compact and simple. Further, since the judging system judges that the sheet feed adapter is coupled only when the predetermined image is detected, the operation mode can be detected without error.

In particular, the image scanner may be provided with a line image sensor extending in a predetermined direction. In this case, the line image sensor may have an effective scanning area which contributes to scanning of image on an original and at least one non-effective scanning area which does not contribute to scanning of the image on the original, and preferably, the predetermined image may be formed on the predetermined surface at a portion facing the noncontributing area.

Optionally, each end portion of the line image sensor is used as the non-effective scanning area and an area between the non-effective scanning areas is used as the effective scanning area.

The predetermined image may include a monochromatic image, a color image, a predetermined pattern, or a combination thereof.

Optionally, a chart used for white level compensation of the line image sensor is formed on the predetermined surface of the sheet feed adapter, at a portion facing the effective scanning area.

Further optionally, the scanner may be provided with: a plurality of rollers rotatable about axes which are parallel to the extending direction of the line image sensor; and a driver that drives the plurality of rollers to rotate.

Thus, when the sheet feed adapter is detached, the scanner functions as a self-running scanner, while when the sheet feed adapter is coupled, the driving force of the self-running scanner can be used for automatic sheet feeding.

Preferably, the sheet feed adapter may have a plurality of freely rotatable rollers. The freely rotatable rollers are arranged at positions corresponding to the plurality of rollers of the scanner when the sheet feed adapter is coupled to the scanner. The plurality of freely rotatable rollers may be biased towards the plurality of rollers of the scanner when the sheet feed adapter is coupled to the scanner so that the plurality of freely rotatable rollers are driven by the plurality of rollers of the scanner to rotate.

Since the sheet feed adapter does not have a power source, and utilizes the driving force of the scanner for feeding the original, the sheet feed adapter can be made simple and compact.

Further optionally, the line image sensor has an image scanning surface which faces an original to be scanned, and a paper sensor for detecting presence or absence of a paper is provided on an upstream side of the image scanning surface, along a direction in which the original is fed when the sheet feed adapter is coupled to the scanner.

Furthermore, a controller may be provided for controlling the driver to rotate the plurality of rollers, when the paper sensor detects presence of the original, so that a leading edge of the original reaches the image scanning surface.

According to another aspect of the invention, there is provided a scanner system, which is provided with: a self-running scanner provided with a self-running mechanism; and a sheet feed adapter to be coupled onto an image scanning surface of the self-running scanner, driving force of the self-running mechanism of the self-running scanner feeding an original when the sheet feed adapter is coupled to the scanner, a predetermined image being formed on a surface facing the image scanning surface of the self-running scanner for indicating that the sheet feed adapter is coupled to the scanner.

Optionally, the scanner may include a line image sensor, scanning area of the line image sensor including a first area to be used for scanning an image on an original, and a second area which is used for scanning the image formed on the sheet feed adapter.

DESCRIPTION OF THE EMBODIMENTS

The invention will be described hereinafter with reference to the accompanying drawings.

Figure 1:
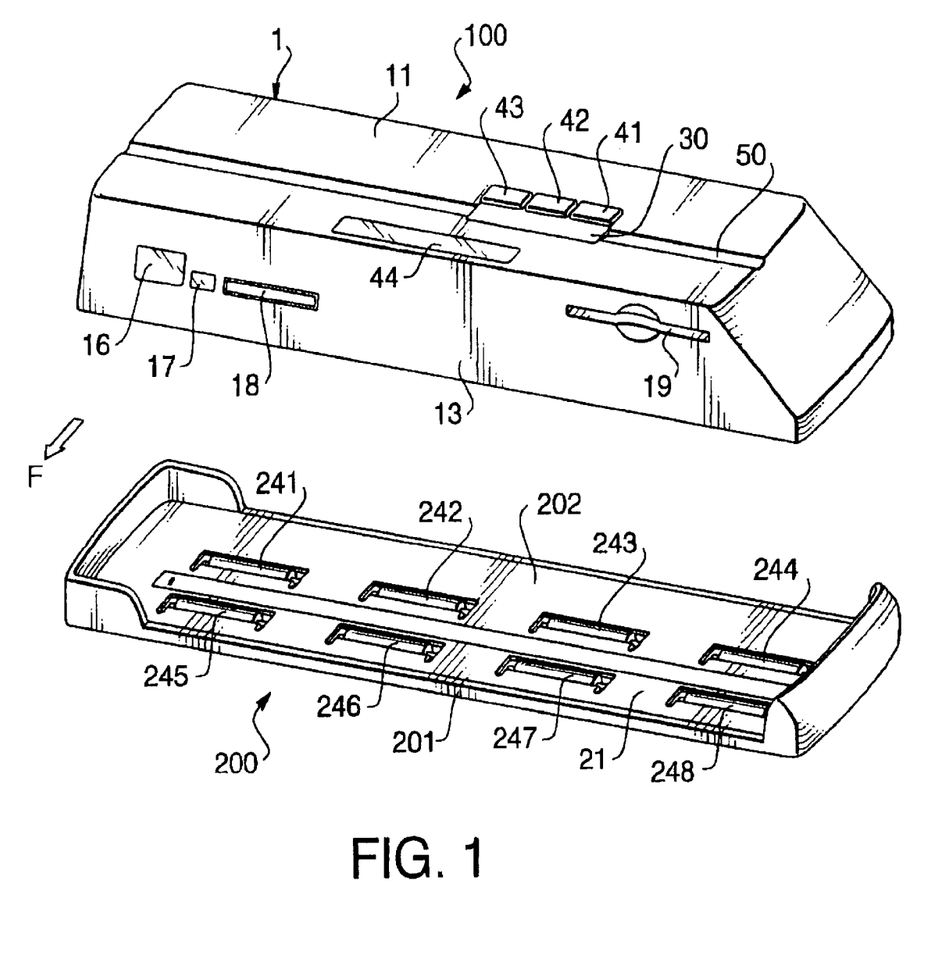
FIG. 1 is a perspective view schematically showing an appearance of a scanner according to the present invention when a sheet feed adapter is removed.
Figure 2:
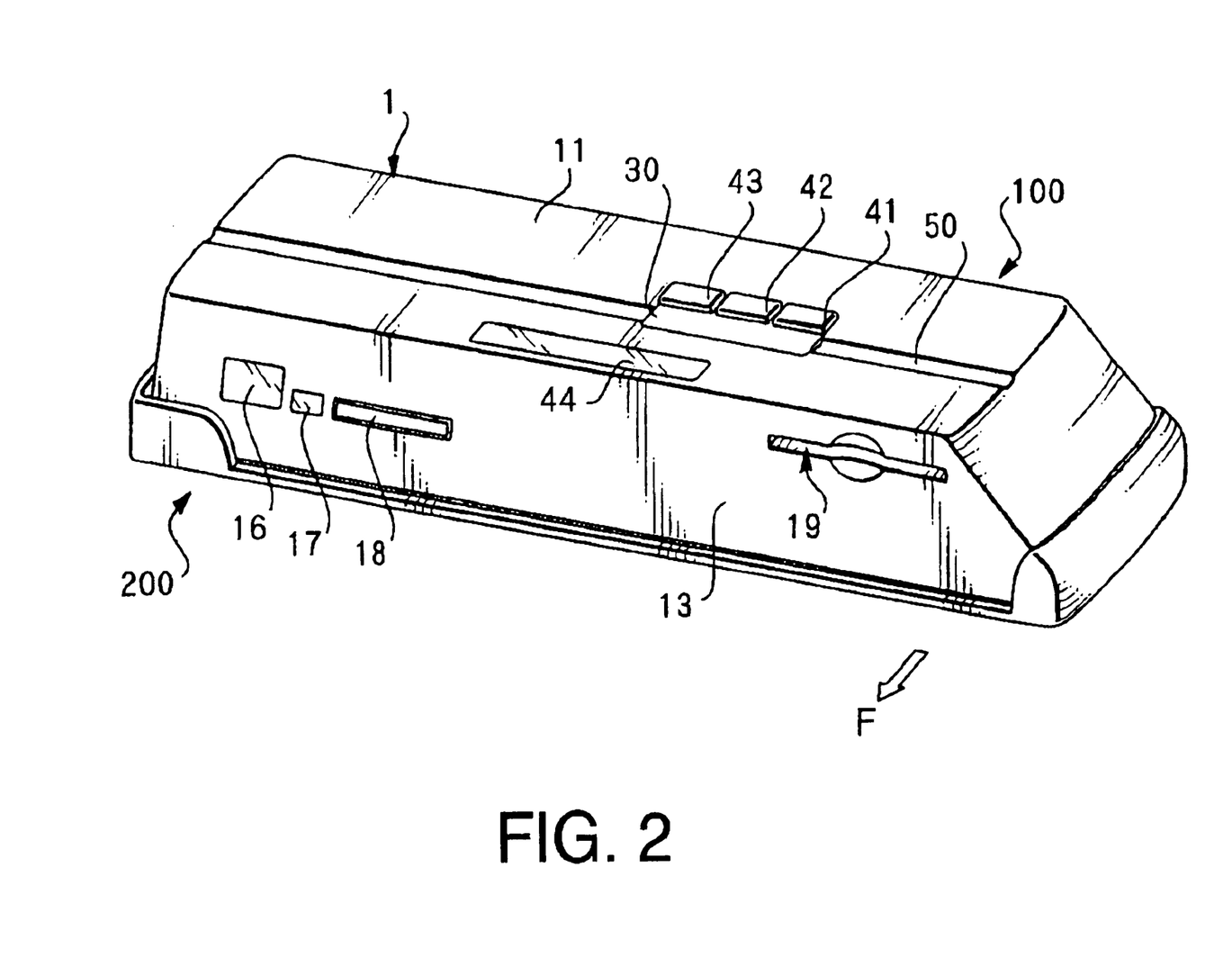
FIG. 2 is a perspective view schematically showing an appearance of the scanner according to the present invention when the sheet feed adapter is coupled to the scanner.

FIG. 1 is a perspective view showing an appearance of a scanner system according to the present invention. In FIG. 1, a sheet feed adapter 200 is detached from a scanner 100, and in FIG. 2, the sheet feed adapter 200 is coupled to the scanner 100. When the sheet feed adapter 200 is detached from the scanner 100, the scanner operates in a hand scan mode, i.e., the scanner 100 is placed and moved on an original to be scanned. When the sheet feed adapter 200 is coupled to the scanner 100, the scanner 100 operates in a sheet through mode, i.e., the original is fed through between the scanner. 100 and the sheet feed adapter 200. Feeding direction of the original relative to the scanner 100 is indicated by arrow F in the drawings. That is, when the scanner 100 operates in the hand scan mode, the scanner 100 should be moved, on the original, in a direction opposite to the direction F; and when the scanner 100 operates in the sheet through mode, the original is fed in the direction F.

The scanner 100 is a color scanner which is capable of capturing a color image, outputting image data representative of the scanned image, and storing the image data in an IC memory card. The scanner 100 has a housing 1 whose shape is a rectangle parallelepiped. On an upper surface 11 of the housing 1, an LCD (Liquid Crystal Display) unit 30, operation switches 41–44 are provided. Along the longitudinal direction of the housing 1, a shallow groove 50 indicating a scanning position is formed.

The switch 41 functions as a power switch (ON/OFF switch) and a mode selection switch. The switch 42 is a switch for changing items in a mode selected by the switch 41. The item selected by the switch 42 is established when the switch 43 is depressed. The switch 44 is a start button for initiating image scanning operation. The switch 44 also functions as an end/pause button for terminating/pausing scanning operation.

The LCD unit 30 displays various items in accordance with operation of the switches 41–44 as well as operation status of the scanner 100.

On a side surface 13 of the housing 1, an USB (Universal Serial Bus) interface connector 16 for connecting the scanner 100 with external devices, a power input terminal 17 for connecting an AC adapter, a parallel/serial interface connector 18 for connecting a printer or the like, an IC card connector 19 for inserting an IC card (compact flash memory) are provided. A bottom surface of the housing 1 is a surface which faces an original when an image is scanned.

Figure 3:
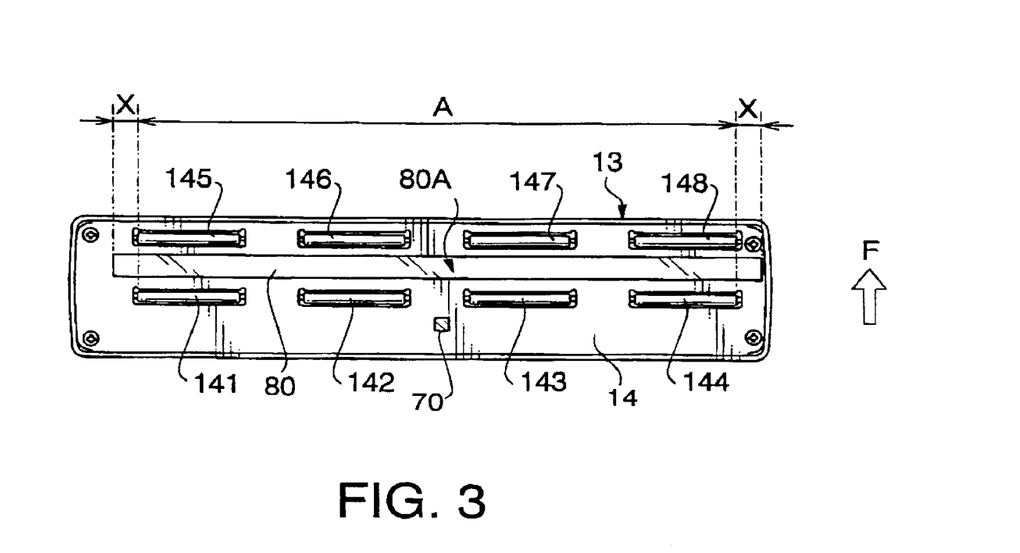
FIG. 3 shows a bottom surface of a housing of the scanner shown in FIGS. 1 and 2.

FIG. 3 shows the bottom surface of the housing 1. The scanner 100 employs a contact type line image sensor (i.e., CIS) 80. The line image sensor 80 extends along the longitudinal direction of the housing 1. An image reading surface 80A of the line image sensor 80 is made movable in a direction perpendicular to the bottom surface 14 of the housing 1, and a plane of the image reading surface 80A substantially coincides with a plane contacting rollers 141–148 (i.e., a surface of the original when the image is scanned).

The line image sensor 80 includes 2592 light receiving elements (which will be referred to as pixels) corresponding to 2592 image dots in the embodiment, and 2552 pixels thereof between side end portions X, X each including 20 pixels is an effective scanning area (i.e., an area A in FIG. 3). The areas X and X outside the effective area A of the line image sensor 80 are not used for normal image scanning. However, the areas X and X can also be used for reading an image. In the scanner 100 according to the embodiment, the areas X and X are used for detecting whether the sheet feed adapter 200 is coupled to the scanner 100, which will be described in detail later.

In the following description, the effective area A is also referred to as a first area, and the areas X and X outside the effective area A will also be referred to as second areas.

As shown in FIG. 3, eight rollers 141–148 which are rotatable about axes extending the longitudinal direction of the housing 1 of the scanner 100 are provided. When the scanner 100 is used without the sheet feed adapter 200, the rollers 141–148 are driven to rotate and thus the scanner 100 operates as a self-running scanner.

Specifically, when the scanner 100 is used without the sheet feed adapter 200, the scanner 100 is placed on the original. By slightly pushing the scanner 100 against the original and depressing the switch 44, the scanner 100 scans an image on line basis (i.e., the main scanning is executed), and then the rollers 141–148 are driven to rotate to move the scanner 100 in the direction perpendicular to the extending direction of the line image sensor 80 (i.e., the auxiliary scanning is executed).

As shown in FIG. 3, on the bottom surface 14 of the scanner 100, a paper sensor 70 is provided on the upstream side in the sheet feed direction F of the original. The paper sensor 70 is a sensor for detecting whether the reading surface (i.e., the bottom surface 14) of the scanner 100 faces the original or not.

Figure 4:
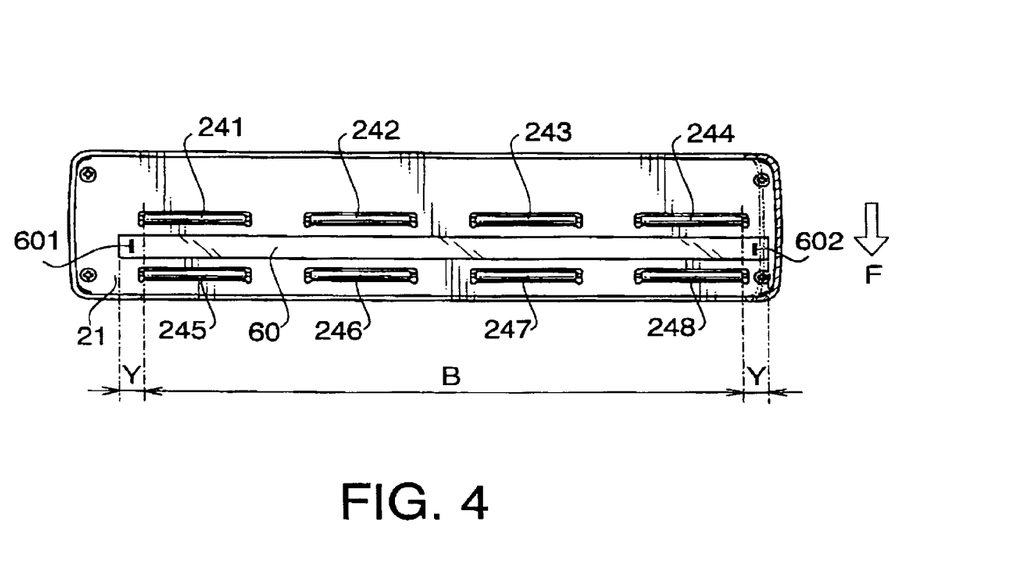
FIG. 4 shows a top view of the sheet feed adapter shown in FIGS. 1 and 2.

FIG. 4 is a top view of the sheet feed adapter 200, showing an upper surface 21 which faces, when coupled to the scanner 100, the bottom surface 14 of the scanner 100.

On the upper surface 21 of the sheet feed adapter 200, rollers 241–248 which are freely rotatable about axes extending in a longitudinal direction of the adapter 200 are provided. When the sheet feed adapter 200 is coupled to the scanner 100, the rollers 141–148 contact the rollers 241–248, respectively. Specifically, the rollers 241–248 are urged, at a predetermined force, towards the rollers 141–148. Accordingly, when the sheet feed adapter 200 is coupled to the scanner 100 and the rollers 141–148 are driven to rotate, the rollers 241–248 are driven by the rollers 141–48 to rotate. If a sheet of an original is inserted between the bottom surface 14 of the scanner 100 and the upper surface 21 of the sheet feed adapter 200, the sheet is nipped between the rollers 141–148 and the rollers 241–248, and fed thereby.

Figure 11:
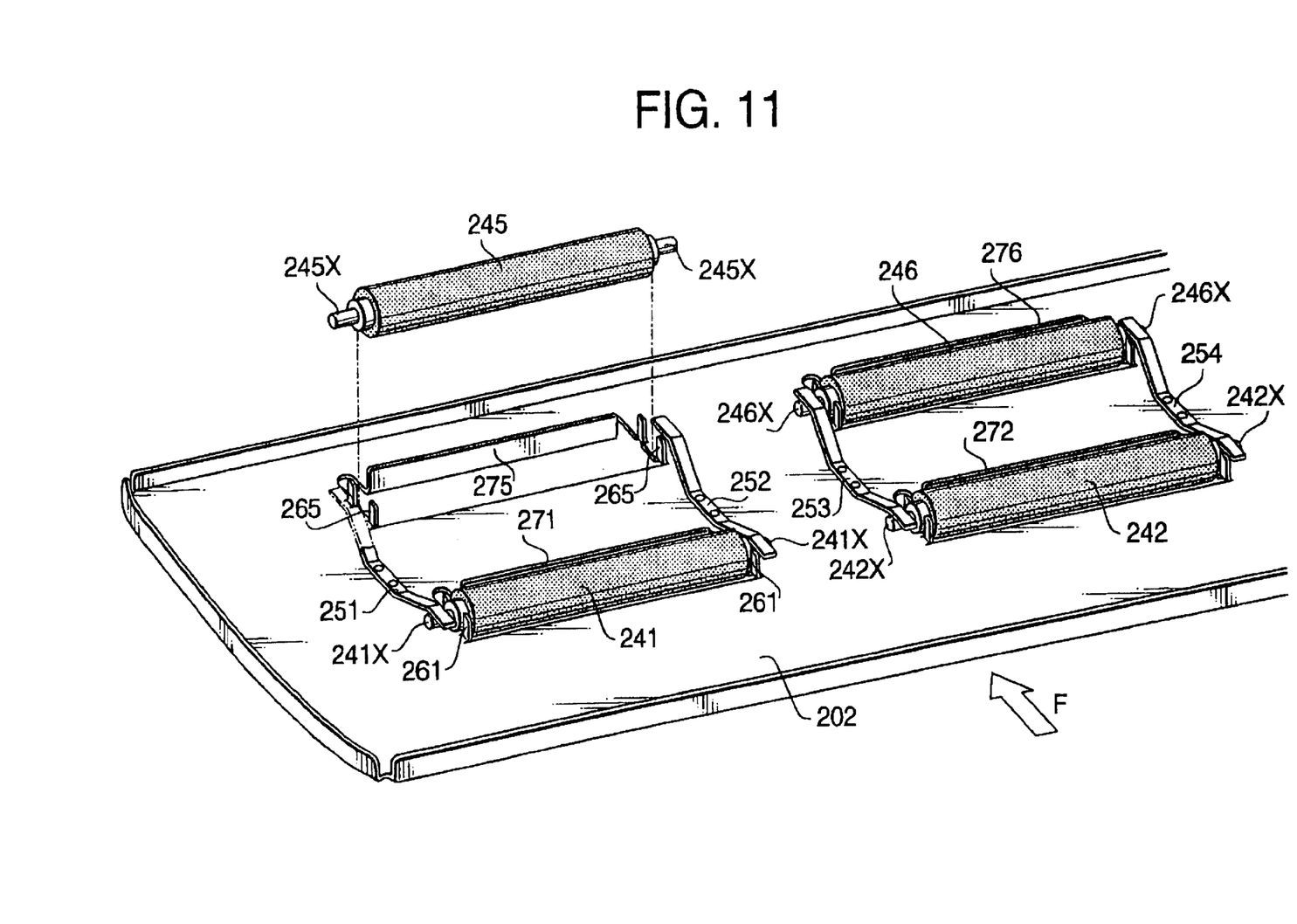
FIG. 11 schematically shows a roller supporting/urging structure.

FIG. 11 schematically shows a structure for urging the rollers 241–248.The sheet feed adapter 200 includes a body 201 and a bottom plate 202 (see FIG. 1), and there is a space between the body 201 and the bottom plate 202 for accommodating the structure for urging the rollers 241–248. FIG. 11 shows the structure viewed from a back side of the bottom plate 202.In the following description, a structure for the rollers 241 and 245 will be explained. However, all the rollers 241–248 are supported in the similar manner.

As shown in FIG. 11, on both axial end sides of the roller 241, U-shaped shaft receiving/guiding portions 261 and 261 are formed for rotatably receiving both ends of a shaft 241X of the roller 241. Similarly, on both axial end sides of the roller 245, U-shaped shaft receiving/guiding portions 265 and 265 are formed for rotatably receiving both ends of a shaft 245X of the roller 245. Further, on a downstream side of the roller 241, with respect to the sheet feeding direction F, a upright portion 271 is formed. The upright portion 271 is formed by bending the bottom plate 202 so as to prevent the leading edge of the inserted sheet from being caught at the edge of an opening from which the roller is exposed. Similarly, on a downstream side of the roller 245, with respect to the sheet feeding direction F, a upright portion 275 is formed.

A pair of plate springs 251 and 252 are provided for urging the rollers 241 and 245 towards the scanner 100. Specifically, the plate springs 251 and 252 are substantially rectangular, slightly bent at the center thereof. The center of each of the plate springs 251 and 252 is fixedly secured to the bottom plate 202, and both end portions of the plate springs 251 and 252 urges the shaft 241X and 245X in a direction where the rollers 241 and 245 protrude outside from the bottom plate 202. It should be noted again that the remaining roller 242–244, 246–248 are supported in the similar maner as described above.

When the sheet feed adapter 200 is coupled to the scanner 100, the rollers 241–248 are pushed by the rollers 141–148, respectively, and slightly retracted along a direction of a slot of the U-shaped portions where the shafts of the rollers are supported, against the urging force of the plate spring.

As shown in FIGS. 3 and 4, an area between the rollers 141–144 and 145–148, and an area between the rollers 241–244 and 245–248 correspond to image reading surface 80 of the scanner 100.

On the upper surface 21 of the sheet feed adapter 200, at a portion between the rollers 241–244 and the rollers 245–248, i.e., a portion corresponding to the image reading surface 80 of the scanner 100, a predetermined chart 60 is formed. In the embodiment, a rectangular sheet is adhered to form the chart 60. Alternatively, the chart 60 may be directly formed (e.g., printed) on the upper surface 21. A length, in the longitudinal direction of the sheet feed adapter 200, of the chart 60 is substantially the same as the longitudinal length of the image reading surface 80 of the scanner 100. An area B of the chart 60 (see FIG. 4) corresponds to the first area A of the scanning surface 80, and is used as a white level setting chart. Portions Y and Y of the chart 60 outside the area B correspond to the second areas X and X of the scanning surface 80A, and predetermined images are formed on the portions Y and Y.

The scanner 100 determines that the sheet feed adapter 200 is coupled to the scanner when the predetermined images are scanned by the second areas X and X of the image sensor 80. Thus, on the portions Y and Y of the chart 60 outside the area B, characteristic images are formed so as to ensure the detection thereof. In FIGS. 1 and 4, the characteristic images formed outside the area A (which will also be referred to as characteristic image areas) are black lines 601 and 602 on a white background.

Since coupling of the sheet feed adapter 200 is detected only when the predetermined images are detected by predetermined portions X and X of the line image sensor 80, coupling of the sheet feed adapter 200 can be detected accurately in comparison with a case where detection is made based on an ON/OFF status of a micro-switch.

Figure 5:
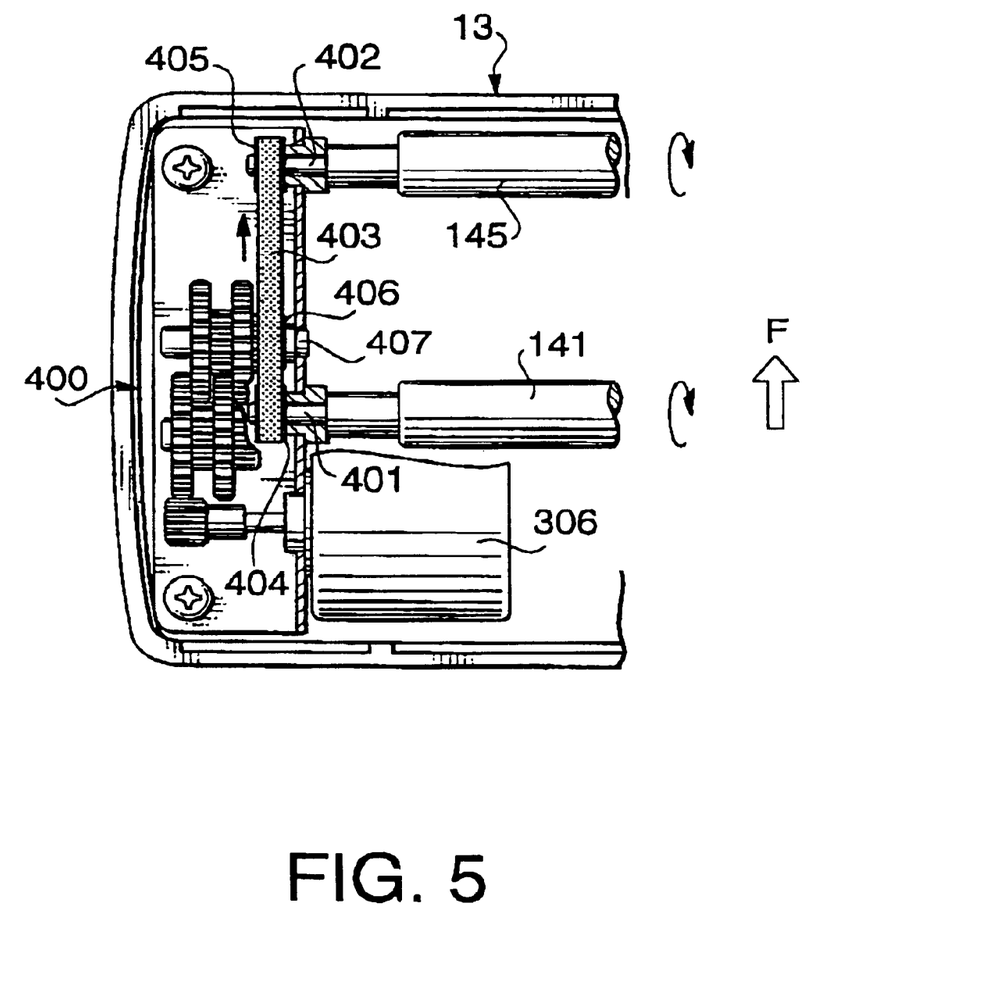
FIG. 5 shows a roller driving mechanism of the scanner.

FIG. 5 shows a driving mechanism for rotating the rollers 141–148. In one end side portion along the longitudinal direction of the housing 1 of the scanner 100, a feed motor 306 which is a pulse motor, a reduction gear train 400, pulleys 404 and 405, a pulley 406 secured to an output shaft 407 of the gear train 400, a belt 403 wound around the pulleys 404, 405 and 406. The pulleys 404 and 405 are secured onto the shafts 401 and 402, respectively. When the feed motor 306 is driven to rotate, the shafts 401 and 402 rotate synchronously, in the same direction, via the driving mechanism above shown in FIG. 5.

Figure 6:
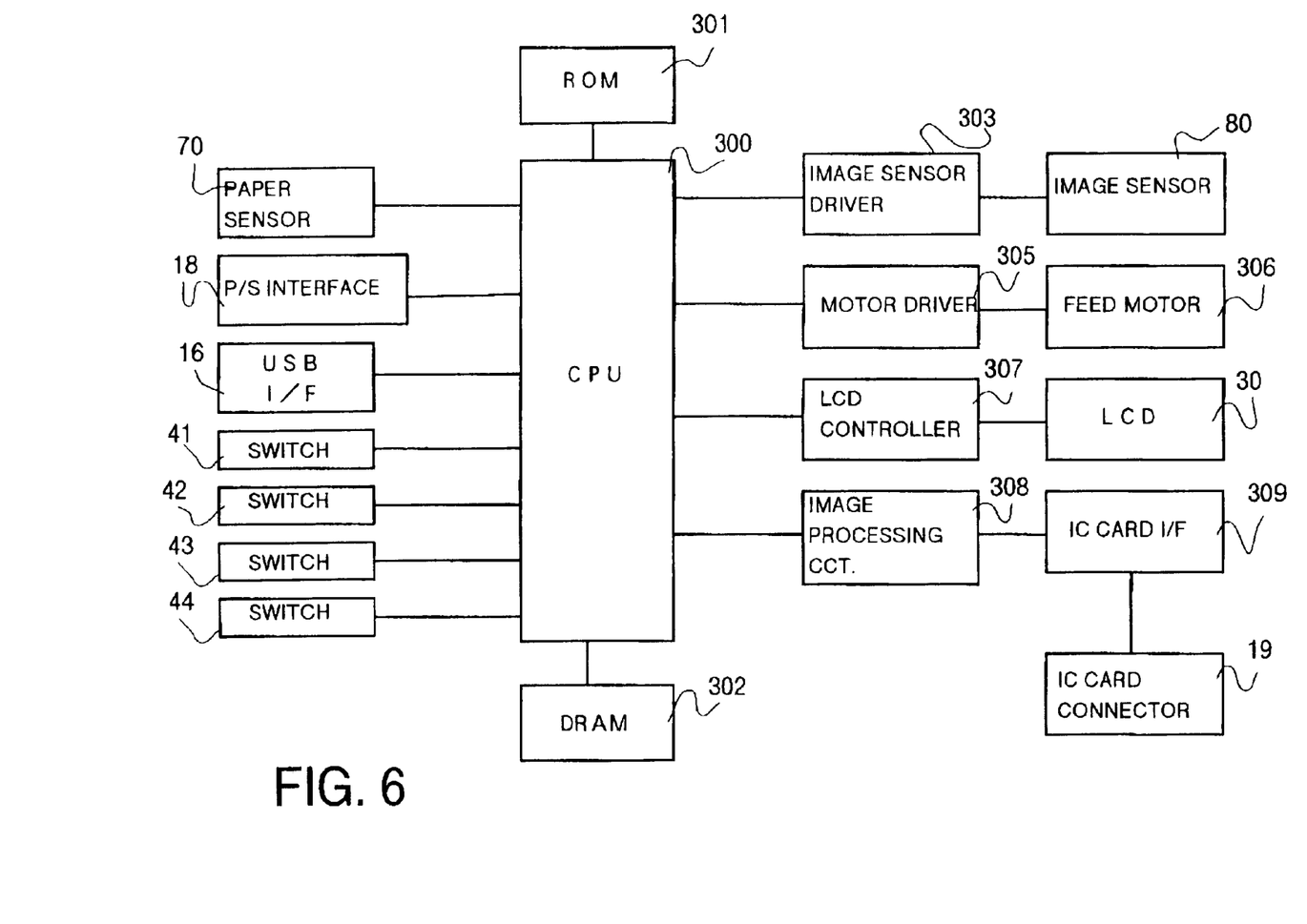
FIG. 6 is a block diagram showing a control system of the scanner.

FIG. 6 is a block diagram illustrating a control system of the scanner 100.

The scanner 100 is provided with a CPU (Central Processing Unit) 300, to which the switches 41–44, the USB interface connector 16, the P/S (parallel/serial) interface connector 18, the paper sensor 70 are connected. Further, a ROM 301 storing programs to be executed by the CPU 300, and DRAM 302 for temporarily storing scanned data and/or being used as work area are connected to the CPU 300.

The CPU 300 controls an image sensor controller 303 to scan an image using the image sensor 80, and stores the image data in the DRAM 302. Further, the CPU 300 controls a motor driver 305 to drive the feed motor 306. Furthermore, the CPU 300 controls an LCD controller 307 to drive the LCD unit 30.

When the image data stored in the DRAM 302 is stored in the IC card, the CPU 300 controls an image processing circuit 308 to perform compensation/compression operations, and then via the IC card interface 309, transmits the processed data into the IC card (compact flash memory) inserted in the card slot of the IC card connector 19.

Figure 7:
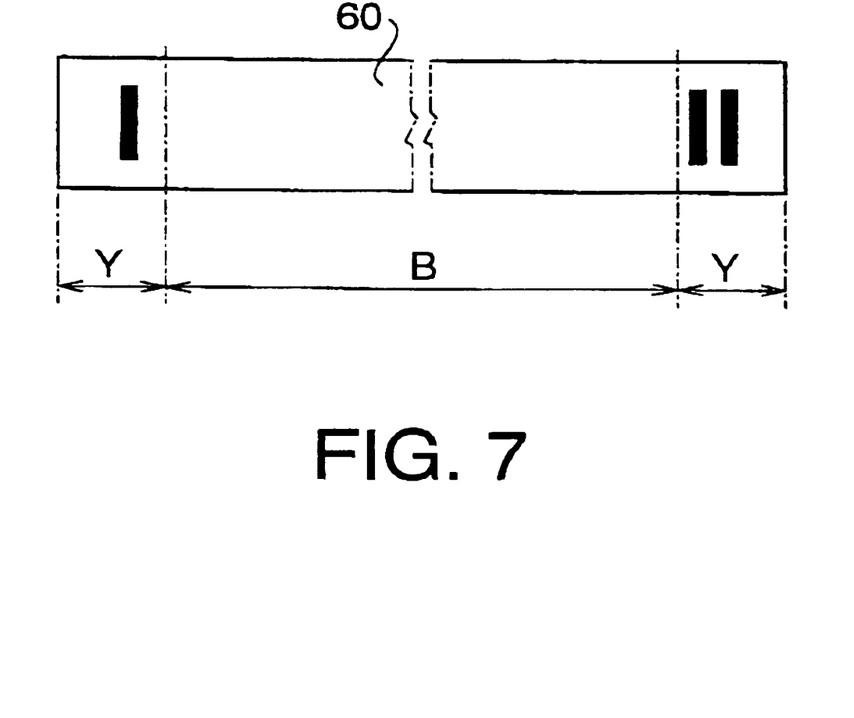
FIG. 7 is a modification of a chart formed on the sheet feed adapter.

FIG. 7 shows an example of a modification of the chart 360. In FIG. 4, in the characteristic areas Y and Y, the same images are formed. In the modification shown in FIG. 7, in one of the characteristic areas Y and Y, one line is formed, and in the other characteristic area Y, two lines are formed.

Figure 8:
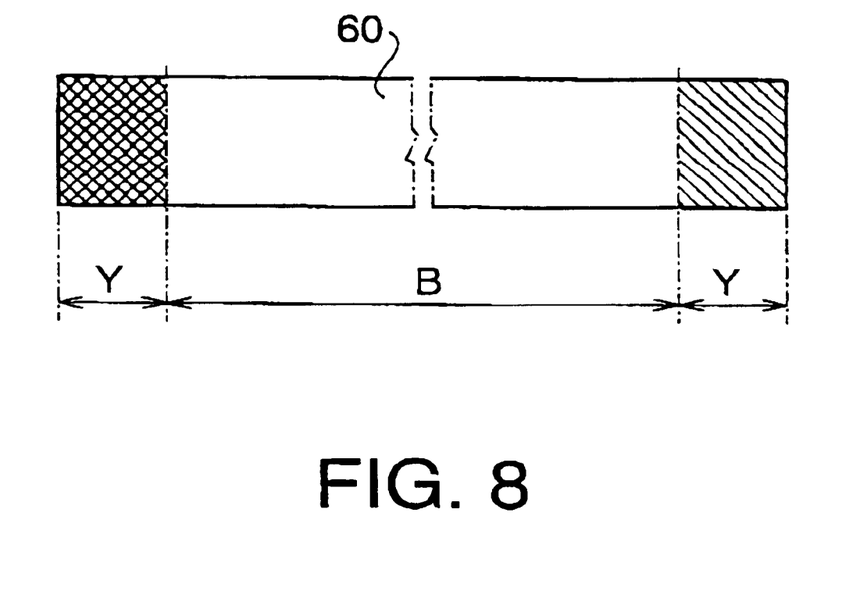
FIG. 8 is another modification of the chart formed on the sheet feed adapter.

FIG. 8 shows another modification of the chart 60. In FIGS. 4 and 7, in the characteristic areas, black lines are formed on the white background. As mentioned above, the scanner 100 is a color scanner and is capable of scanning a color image. In this modification, the characteristic areas Y and Y are defined as areas having predetermined colors. It should be noted that the two areas Y and Y may have the same color, or predetermined combination of two different colors. Optionally, the characteristic areas Y and Y may be defined by predetermined colors and patterns formed thereon.

Further to the above, the embodiment can be further modified such that coupling of the adapter 200 is detected based on the area B of the chart 60 as well as the images of the characteristic areas Y and Y. That is, it is determined that the sheet feed adapter 200 is coupled only when the predetermined images are formed on the characteristic areas Y and Y, and further the white level setting chart is formed on the area B.

Figure 9:
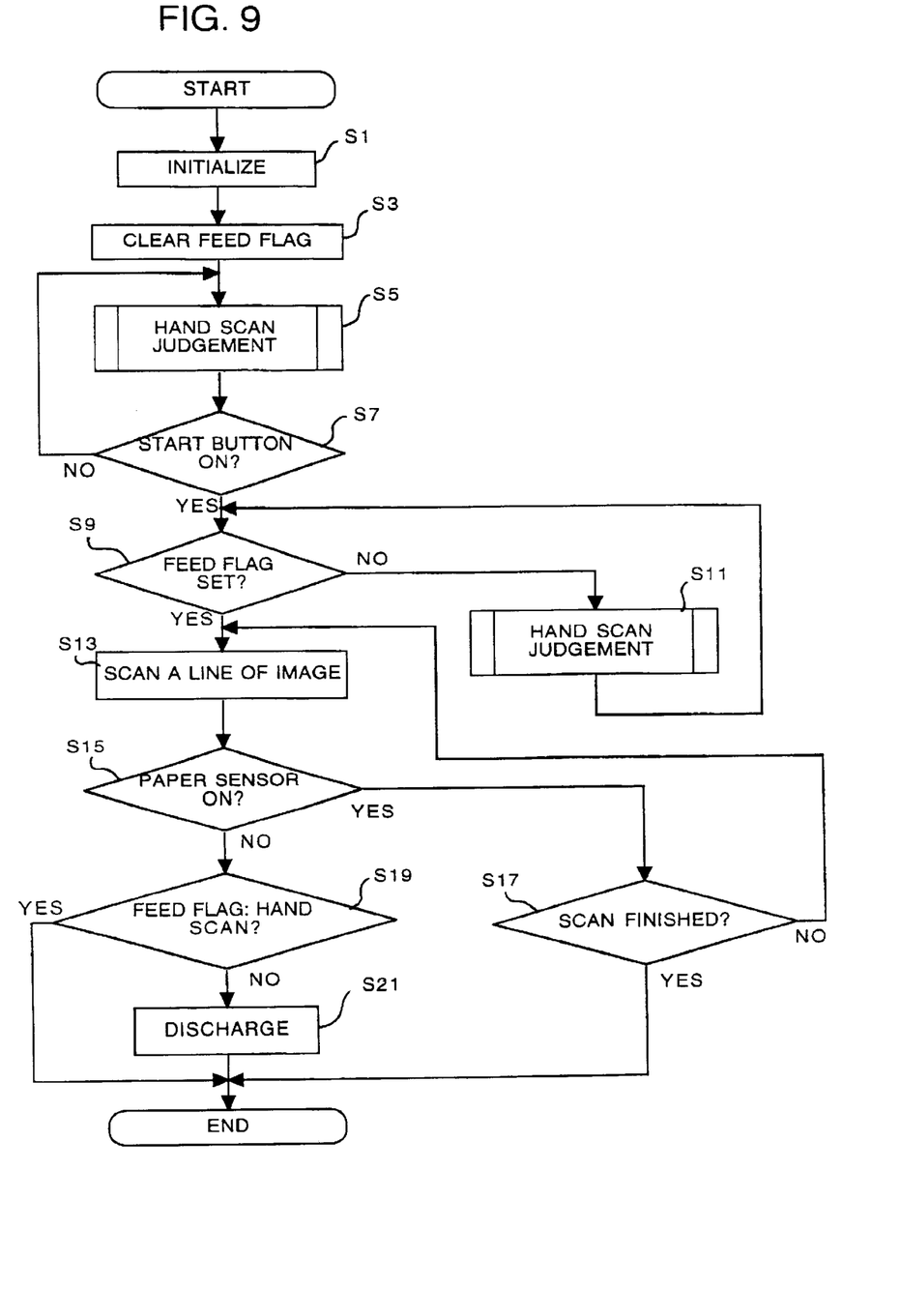
FIG. 9 is a flowchart illustrating an image scanning process.

FIG. 9 is a flowchart illustrating a scanning process. The process shown in FIG. 9 initiates when the power switch 41 is operated and the scanner 100 is powered ON.

Firstly, an initialization of interfaces 16 and 18, DRAM 302 and the like is executed (S1). In S3, a feed flag is cleared. The feed flag is a flag indicating whether (a) the sheet feed adapter 200 is detached from the scanner 100 and thus the scanner 100 operates in a hand scan mode; or (b) the sheet feed adapter 200 is coupled to the scanner 100 and thus the scanner 100 operates in a sheet through mode. In S3, the feed flag is set to indicate none of the above status (a) or (b).

Until a start button (i.e., the switch 44) is operated, a hand scan judgement subroutine is called in S5. The hand scan judgement subroutine is a subroutine for detecting whether the scanner 100 is used in the hand scan mode or the sheet through mode, and then sets the feed flag accordingly.

Figure 10:
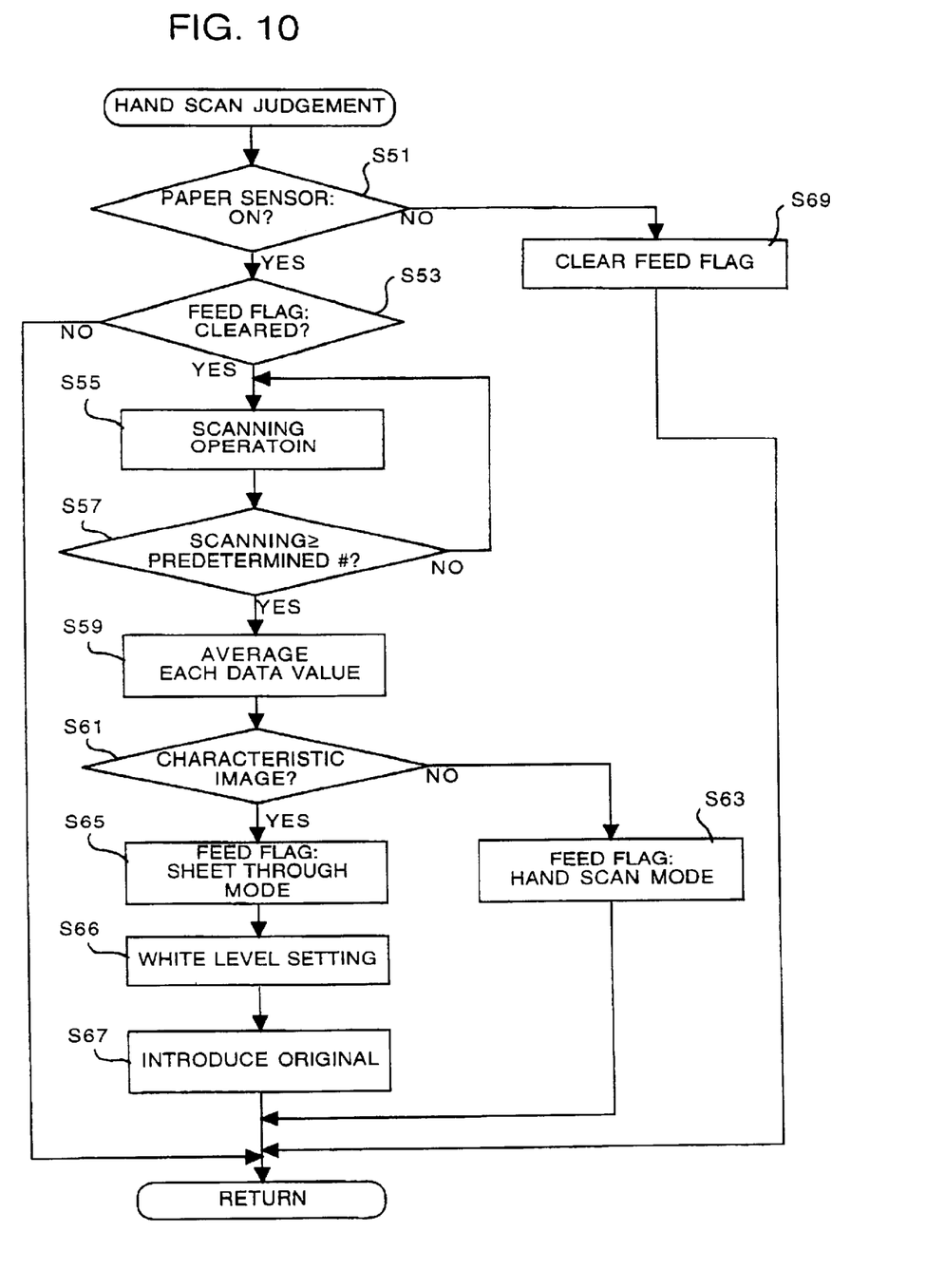
FIG. 10 is a flowchart illustrating a hand-scan judgement process.

FIG. 10 is a flowchart illustrating the hand scan judgment subroutine. In the hand scan judgement, at S51, an ON/OFF status of the paper sensor 70 is detected. The paper. sensor 70 is an optical sensor which is turned ON when it receives the light reflected by the original. Accordingly, when the original faces the paper sensor 70, the paper sensor 70 is turned ON. If the sheet feed adapter 200 is coupled to the scanner 100, and the original has not yet been inserted, then the paper sensor 70 is in OFF status.

If the paper sensor 70 is OFF (S51: NO), then the feed flag is cleared in S69, and the subroutine is terminated and control returns to S7 of FIG. 9. Accordingly, if the scanner 100 is used in the hand scan mode and the scanner 100 has not been placed on an original, or if the sheet feed adapter 200 is coupled to the scanner 100 and the original has not been inserted, the feed flag is cleared.

When the scanner 100 is used in the hand scan mode and the scanner 100 is placed on the original, or when the sheet feed adapter 200 is coupled to the scanner 100 and the original is inserted between the bottom surface 14 of the scanner 100 and the upper surface 21 of the sheet feed adapter 200, the paper sensor 70 is ON (S51: YES). At this stage, the feed flag has been cleared, and accordingly, determination in S53 is YES, and control proceeds to S55.

In S55, an image is scanned by the image sensor 80. Until the number of scanning operations exceeds a predetermined number, scanning operation at S55 is repeated. When the scanning operation at S55 is repeated, without driving the feed motor 306, the scanning operation at the same position is repeated, and the image data is accumulated in the DRAM 302. After the scanning operation is repeated predetermined times (S57: YES), average data value of the scanned and accumulated data for each pixel is calculated and stored as the line image data in the DRAM 302.

In S61, it is judged whether the predetermined images (cf. FIGS. 4, 7 and 8) have been detected in the characteristic areas Y and Y of the chart 60. If the sheet feed adapter 200 is not coupled to the scanner 100, the predetermined images are not detected (S61: NO). In this case, the feed flag is set to indicate the hand scan mode at S63, and the hand scan judgement subroutine is terminated.

If the predetermined images are detected (S61: YES), the feed flag is set to indicate the sheet through mode (S65). In S66, the white level setting area of the chart 60 is scanned, and compensation values for each pixel is determined, which are stored in a buffer area in the DRAM 302. The compensation values stored at S66 will be referred to by the image processing circuit 308 when the scanned data once stored in the DRAM 302 is output, for example, stored in the IC memory card. It should be noted that when the scanner operates in the hand scan mode, the compensation values for the white level are not obtained when an image is scanned. In this case, default values which have been determined based on measurement values will be used.

In S67, the original is fed until the leading edge of the inserted sheet reaches the scanning position. That is, if the paper sensor 70 detects the existence of a sheet, the leading edge of the sheet is considered to be located at a position where the rollers 141–144 and rollers 241–244 contact. Therefore, by driving the feed motor 306 with the motor driver 305 by an amount corresponding to a distance where the rollers 141–144 and rollers 241–244 contact to the image scanning position, the leading edge is accurately located at the scanning position.

After the hand scan judgement subroutine has been executed at S5 of FIG. 9, if the start button (switch 44) is depressed (S7: YES), control proceeds to S9. It should be noted that, when a loop of S5 and S7 is repeated, and when the paper sensor 70 is once judged to be ON at S5 and the feed flag has been set at S63 or S65 once, if the status of the paper sensor changes to OFF (S51: NO) before the start button is depressed, the feed flag is cleared (S69), and the above-described process will be repeated again.

In the loop of S5 and S7, if the paper sensor 70 is ON and the feed flag is set, and the status is held, determination in S51 is made YES, and determination in S53 is NO. Therefore, no substantial procedure is executed in the hand scan judgement subroutine, and the subroutine is terminated.

If the start button (switch 44) is depressed (S7: YES), it is judged whether the feed flag has been set (S9). If the start button has been depressed when the paper sensor 70 is in OFF status, the feed flag is cleared in S69, and thus, it is judged that the feed flag has not set (S9: NO), and the hand scan judgement subroutine is executed in S11. Accordingly, the image scanning procedure after S13 will be executed only when the paper sensor 70 is ON, i.e., when the scanning surface 80 faces the original.

If it is judged that the feed flag has been set (S9: YES), a line of image is scanned in S13, and then the feed motor 306 is driven by an amount corresponding to one scan line. When the scanner 100 is used as the hand scan mode, the scanner 100 moves on the original by one scan line. If the scanner is used in the sheet through mode, the original is fed by the amount corresponding to the one scan line.

While the Paper sensor 70 is in ON status (S15: YES), i.e., the original is located under the scanner 100, control proceeds to S17, where it is judged whether a user of the Scanner 100 performs an operation to stop scanning. In the embodiment, when the power switch 41 is depressed twice within a predetermined duration of time, it is determined that the user intends to stop scanning. If the operation to stop scanning is executed (S17: YES), the procedure of FIG. 9 is terminated. Until the user intentionally stops scanning, determination in S17 is NO, and the succeeding line is scanned (S13). Until the Paper sensor 70 is turned OFF, the scanning operation is repeated.

If the paper sensor 70 is in OFF status (S15: YES), control proceeds to S19.

If the scanner 100 operates in the hand scan mode, the paper sensor 70 is turned OFF when the paper sensor reaches the end of the original. If the scanner 100 operates in the sheet through mode, the paper sensor 70 is OFF when the trailing edge of the original reaches the downstream side of the paper sensor 70.

In S19, if the scanner 100 operates in the hand scan mode and the paper sensor 70 is OFF (S19: YES), the scanning operation is terminated immediately. If the scanner 100 operates in the sheet through mode and the paper sensor 70 is OFF (S19: NO), then the feed motor 306 is driven so that the original is completely discharged (S21), and then the process shown in FIG. 9 is terminated.

As described above, according to the scanner system, with a simple and compact structure, the operation mode can be automatically and accurately detected. Further, the sheet feed adapter does not have a power source, the adapter can also be made compact. Furthermore, since the adapter is coupled to the scanner so as to face the scanning surface of the scanner, the adapter functions as a protector for the image sensor 80. Thus, the entire scanner system can be made compact, and portability is improved.

The present disclosure relates to the subject matter contained in Japanese Patent Application No. HEI 10-132920, filed on May 15, 1998, which is expressly incorporated herein by reference in its entirety.

What is claimed is:

1. A scanner system, comprising:
   a scanner provided with an image sensor; and
   a sheet feed adapter detachably coupled to said scanner, a predetermined surface of said sheet feed adapter facing said image sensor when said sheet feed adapter is coupled to said scanner, said scanner operating in a hand scan mode when said sheet feed adapter is detached from said scanner and in a sheet through mode when said sheet feed adapter is coupled to said scanner, an original to be scanned being automatically fed between said predetermined surface and said image sensor when said scanner operates in said sheet through mode,
   wherein a predetermined image is formed on said predetermined surface of said sheet feed adapter, and
   wherein said scanner comprises a judging system that judges that said sheet feed adapter is coupled to said scanner only when said image sensor scans said predetermined image on said predetermined surface of said sheet feed adapter.

2. The scanner system according to claim 1, wherein said image scanner comprises a line image sensor extending in a predetermined direction, said line image sensor having an effective scanning area which contributes to scanning of image on an original and at least one non-effective scanning area which does not contribute to scanning of the image on the original, said predetermined image being formed on said predetermined surface at a portion facing said non-contributing area.

3. The scanning system according to claim 2, wherein each end portion of said line image sensor is used as said non-effective scanning area and an area between said non-effective scanning areas is used as said effective scanning area.

4. The scanner system according to claim 2, wherein said scanner comprises:
   a plurality of rollers rotatable about axes which are parallel to the extending direction of said line image sensor; and
   a driver that drives said plurality of rollers to rotate.

5. The scanner system according to claim 4, wherein said sheet feed adapter comprises a plurality of freely rotatable rollers, said plurality of freely rotatable rollers being arranged at positions corresponding to said plurality of rollers of said scanner when said sheet feed adapter is coupled to said scanner, said plurality of freely rotatable rollers being biased towards said plurality of rollers of said scanner when said sheet feed adapter is coupled to said scanner, said plurality of freely rotatable rollers being rotatable about axes which are parallel to the extending direction of said line image sensor, said plurality of freely rotatable rollers being driven by said plurality of rollers of said scanner to rotate.

6. The scanner system according to claim 5, wherein said line image sensor has an image scanning surface which faces an original to be scanned, and
   wherein a paper sensor for detecting presence or absence of a paper is provided on an upstream side of said image scanning surface, along a direction in which the original is fed when said sheet feed adapter is coupled to said scanner.

7. The scanner system according to claim 6, further comprising a controller that controls said driver to rotate said plurality of rollers, when said paper sensor detects presence of the original, so that a leading edge of the original reaches said image scanning surface.

8. The scanner system according to claim 6, wherein said judging system judges whether said predetermined image is formed on said predetermined surface of said sheet feed adapter at portions facing said non-effective scanning area, in accordance with an average of data values obtained by the predetermined number of times of the scanning operations.

9. The scanner system according to claim 4, wherein said plurality of rollers function as rollers for moving said scanner relative to the original when said sheet feed adapter is detached from said scanner.

10. The scanner system according to claim 1, wherein said predetermined image comprises a monochromatic image.

11. The scanner system according to claim 1, wherein said predetermined image comprises a color image.

12. The scanner system according to claim 1, wherein said predetermined image comprises an image of a predetermined pattern.

13. The scanner system according to claim 1, wherein a chart used for white level compensation of said line image sensor is formed on said predetermined surface of said sheet feed adapter, at a portion facing said effective scanning area.

14. The scanner system according to claim 1, wherein said judging system scans image of said non-effective scanning area a predetermined number of times.

15. A scanner system, comprising:

a self-running scanner provided with a self-running mechanism; and a sheet feed adapter to be coupled onto an image scanning surface of said self-running scanner, driving force of said self-running mechanism of said self-running scanner feeding an original when said sheet feed adapter is coupled to said scanner, a predetermined image being formed on a surface facing the image scanning surface of said self-running scanner for indicating that said sheet feed adapter is coupled to said scanner.

16. The scanner system according to claim 15, wherein said scanner comprises a line image sensor, scanning area of said line image sensor including a first area to be used for scanning an image on an original, and a second area which is used for scanning said image formed on said sheet feed adapter.

* * * * *